T. J. DOWD.
PORTABLE WATER HEATER.
APPLICATION FILED OCT. 31, 1919.
1,371,876.
Patented Mar. 15, 1921.
2 SHEETS—SHEET 1.
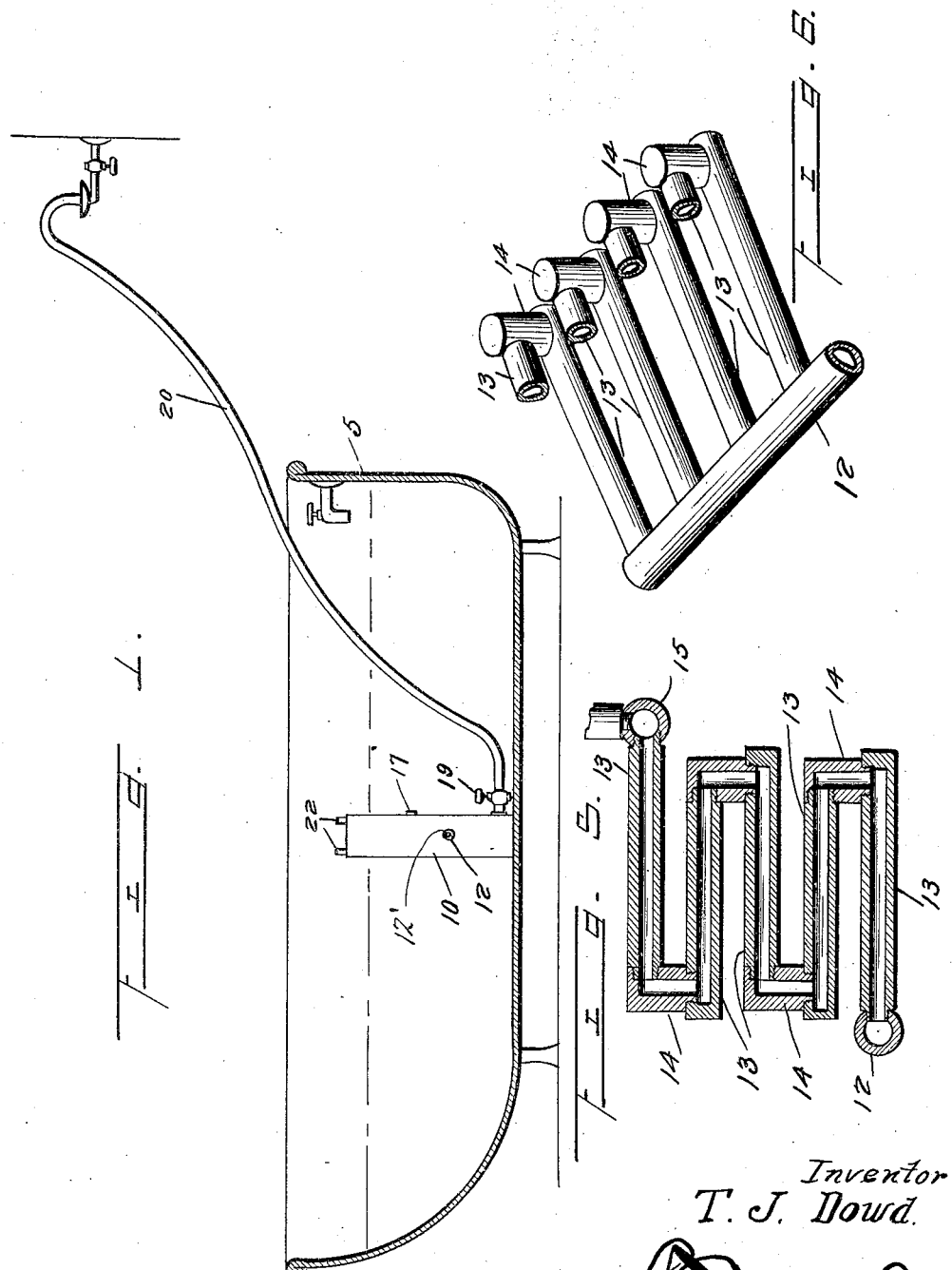
Inventor
T. J. Dowd.
Attorney T. J. DOWD.
PORTABLE WATER HEATER.
APPLICATION FILED OCT. 31, 1919.
1,371,876.
Patented Mar. 15, 1921.
2 SHEETS—SHEET 2.
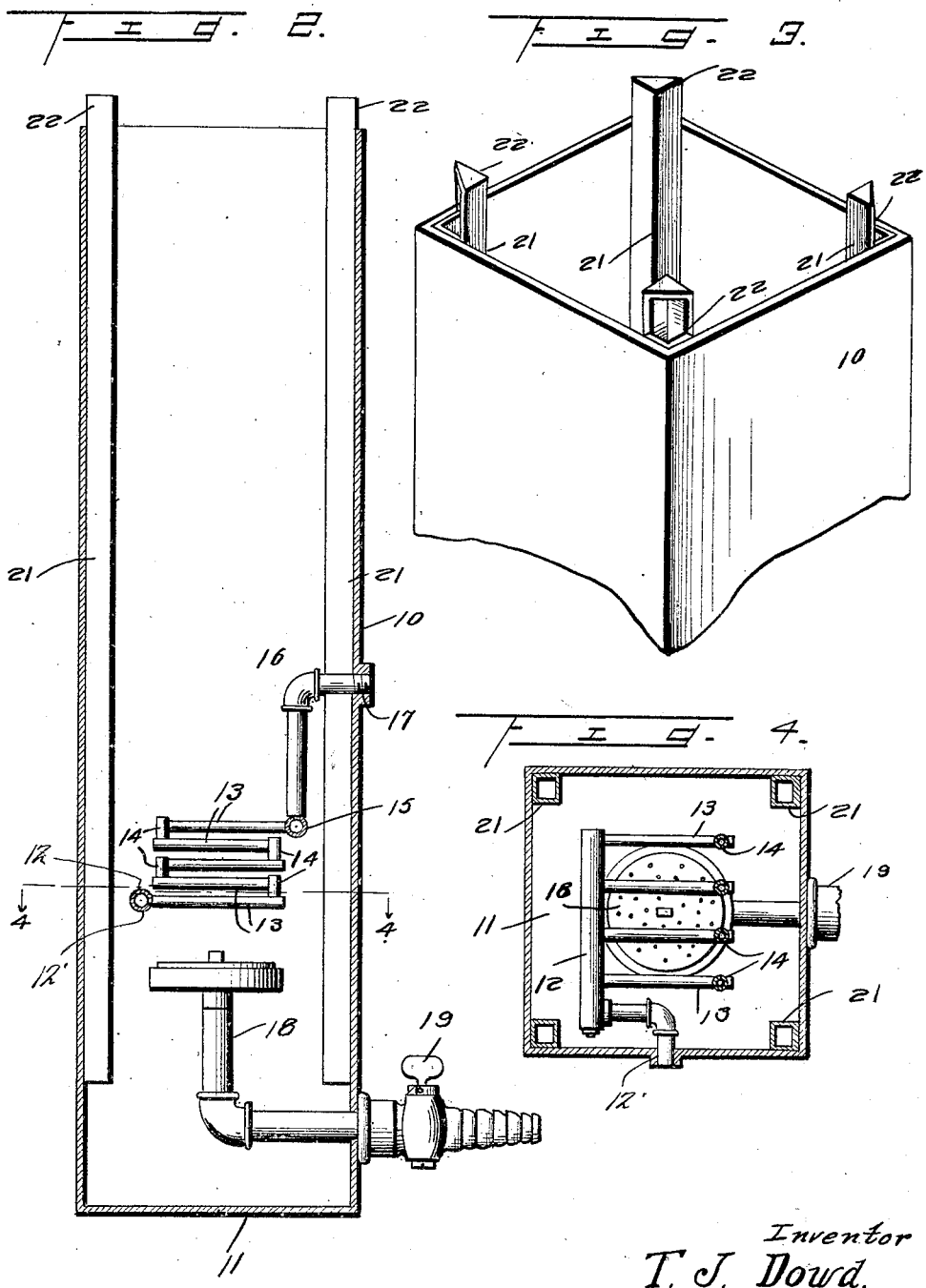

UNITED STATES PATENT OFFICE.

THOMAS J. DOWD, OF NEW YORK, N. Y.

PORTABLE WATER-HEATER.

1,371,876.   Specification of Letters Patent.   Patented Mar. 15, 1921.

Application filed October 31, 1919. Serial No. 334,791.

*To all whom it may concern:*

Be it known that I, THOMAS J. DOWD, a citizen of the United States, residing at Bronx, New York city, and State of New York, have invented certain new and useful Improvements in Portable Water-Heaters; and I do hereby declare the following to be a full, clear, and exact description of the invention, such as will enable others skilled in the art to which it appertains to make and use the same.

My invention relates to water heaters, one of its objects residing in the provision of a portable heater which may be conveniently mounted in a bath tub or other tank to heat the water therein.

Another important object of my invention is to provide a portable heater adapted to be partly submerged in water contained in a bath tub or tank and which is of such construction as to permit the water to circulate through the heater to thoroughly heat the entire contents of the tub or tank.

A further object of the invention resides in the provision of a portable heater which includes a casing having a suitable burner mounted therein adapted to be connected with the usual house supply or any other fuel supply, and which includes ducts for supplying oxygen to the burner that serve to brace or lend rigidity to the casing.

Still another object of my invention is to provide a portable water heater used in conjunction with bath tubs and which when supported in the tub cannot be readily knocked over by the force of the water flowing in the tub.

Another object of my invention is to provide a heater of this type wherein the heater is disposed centrally of a plurality of air ducts so that the products of combustion when passing out of the heater will cause a downdraft through the ducts to supply a maximum quantity of fresh air.

Another object of the invention resides in the provision of an improved heater coil which is so constructed as to permit any one of the tubes thereof to be removed for repairs or cleaning, the heating coil being of such construction as to present a relatively great heating surface and yet is compact.

With the above and other objects and advantages in view which will become apparent from the following description taken in connection with the accompanying drawings, the invention consists in the novel combination of elements, construction and arrangement of parts, operations and specific features all of which are to be hereinafter enlarged upon and recited in the subjoined claims.

On the drawings:

Figure 1 is an elevation of a portable heater constructed in accordance with my invention and supported in operative position in a bath tub and partly submerged in water contained in the tub;

Fig. 2 is a vertical longitudinal sectional view of the heater;

Fig. 3 is a fragmentary perspective view of the heater and illustrating the upper ends of the air ducts for supplying air to the burner;

Fig. 4 is a transverse sectional view taken on line 4—4 of Fig. 2;

Fig. 5 is a vertical sectional view of the heating coil; and

Fig. 6 is a fragmentary perspective view of the heating coil.

Referring to the drawings in detail wherein like characters of reference denote like parts throughout the several views, the numeral 5 designates the bath tub which is shown for the purpose of illustrating the application of my device. My portable water heater which is used preferably for heating water in a bath tub but may be used equally as well for heating water contained in other tanks includes a rectangular casing 10 which is formed with a bottom wall 11 and is open at the top. A water heater coil is mounted centrally within the casing at a point below the water line of the water contained in the bath tub or other receptacle and includes the main feed pipe 12 having one end open and is disposed in an inlet opening 12′ formed in one side of the casing. Extending laterally from the pipe 12 is a series of horizontally disposed tubes 13 from which extend vertically disposed couplings 14. I provide a series of rows of the horizontal tubes 13, each of which carries one of the couplings 14, and which couplings are so arranged as to have communication with the ends of the horizontal tubes so that the water passing therethrough will travel in a sinuous manner. The uppermost row of tubes 13 communicates with a discharge pipe 15 which is disposed at right angles to the horizontal tubes and communicates with an elbow 16 extending through an outlet opening 17 in the casing above the inlet opening 12. It will be manifest that water passing in the inlet 12' circulates through the heating coil in a sinuous manner and is finally discharged into the tub through the outlet opening 17.

A burner 18 is disposed beneath the heating coil to heat the water circulating through the latter. The fuel supply pipe of this burner 18 extends through an opening in the side of the casing adjacent the bottom and is provided with a valve 19. The usual tube 20 communicates with the gas jet or other fuel supply and is connected with the burner as illustrated in Fig. 1.

Disposed within the corners afforded by the meeting edges of the walls forming the casing, is a plurality of vertically disposed air ducts 21 which extend to a point in close proximity to the burner to supply fresh air thereto. The upper ends of these ducts extend above the upper end of the casing. These tubes are closed at the top and are cut away as indicated at 22 so as to effect a downdraft through the ducts to support the combustion of the fuel.

These ducts 22 are rectangular in cross section and fit within the angles afforded by the joining of the walls of the casing and strengthen or brace the walls and thereby lend rigidity to the structure in general.

In the use of the heater it is supported in a vertical position on the bottom of the tub, the level of the water in the tub being below the upper edge of the casing. It will be obvious that the water contained in the tub will pass through the inlet opening 12' and circulate through the various pipes and heated during its passage therethrough and discharged through the discharge opening 17. In this manner the entire contents of the tub will be heated to the desired temperature.

The construction illustrated and described is a practical embodiment of the invention but it will be understood that the same may be modified and that my limits of modification are only governed by what is claimed.

What is claimed is:

1. A portable water heater having a casing, a heating coil within the casing, a heater for the coil, tubes at the corners of the casing to brace the walls thereof, said tubes being open at their tops and adjacent the burner to serve as draft means.

2. A portable water heater having a casing, a heating coil within the casing, a heater for the coil, tubes at the corners of the casing to brace the walls thereof, said tubes extending above the casing and thereat being cut away to provide air inlets and finger grips, and said tube having air outlets adjacent the burner.

3. A portable water heater having a casing for disposition in the water, a water circulating coil within the casing having the inlet end below the outlet end and both ends mounted in the wall of the casing and supporting the coil therein, a burner for the coil within the casing having a fuel supply connection exteriorly of the casing, tubes in the corners of the casing to reinforce the walls thereof, said tubes extending above the casing and there being cut away to provide air inlets and finger grips, and said tubes having air outlets adjacent the burner.

In testimony whereof I affix my signature in presence of two witnesses.

THOMAS J. DOWD.

Witnesses:
 AUGUSTA GLUCK,
 OLGA B. COHEN.